United States Patent [19]

Bailey et al.

[11] 4,096,423
[45] Jun. 20, 1978

[54] DIRECT CURRENT MOTOR CHOPPER PROPULSION SYSTEM

[75] Inventors: Ronald Barry Bailey; Thomas Detlor Stitt; Dennis Francis Williamson, all of Erie, Pa.

[73] Assignee: General Electric Company, Erie, Pa.

[21] Appl. No.: 766,297

[22] Filed: Feb. 7, 1977

Related U.S. Application Data

[63] Continuation-in-part of Ser. No. 662,885, Mar. 1, 1976, abandoned.

[51] Int. Cl.² .............................................. H02P 3/14
[52] U.S. Cl. .................................. 318/370; 318/376; 318/380
[58] Field of Search ............... 318/370, 376, 379, 380, 318/381, 421

[56] References Cited

U.S. PATENT DOCUMENTS

| 3,188,547 | 6/1965 | Zelina | 318/370 |
|---|---|---|---|
| 3,388,306 | 6/1968 | Koppelmann et al. | 318/421 |
| 3,657,625 | 4/1972 | Miller et al. | 318/370 |
| 3,876,920 | 4/1975 | Heissen et al. | 318/370 |
| 3,919,611 | 11/1975 | Takahashi et al. | 318/380 |
| 3,930,191 | 12/1975 | Loderer | 318/376 |

Primary Examiner—Robert K. Schaefer
Assistant Examiner—W. E. Duncanson Jr.
Attorney, Agent, or Firm—J. H. Beusse

[57] ABSTRACT

Apparatus for increasing the available regenerative braking energy and for enabling low current control without frequency variation in a time-ratio controlled main thyristor power circuit for a direct current traction motor. A variable impedance element is serially inserted in a motor armature free-wheeling current path between a free-wheeling diode and the motor armature, the variable impedance element preferably comprising a power resistor and parallel connected thyristor. During electrical regenerative braking the thyristor is used to modulate the power resistor to thereby present a continuously variable impedance in the armature current path. During motoring at very low speeds the thyristor can be operated to modulate the power resistor and thus reduce the minimum controllable level of motor current normally limited to commutation current level without the necessity of reducing the main thyristor operating frequency. The thyristor is gated on by conventional means but is gated off by triggering the commutation circuit of the main thyristor, thus eliminating the need for a separate commutating circuit for the thyristor.

18 Claims, 5 Drawing Figures

DIRECT CURRENT MOTOR CHOPPER PROPULSION SYSTEM

BACKGROUND OF THE INVENTION

This is a continuation-in-part of application Ser. No. 662,885, filed Mar. 1, 1976 now abandoned. The present invention relates to propulsion systems for direct current electric motors and, more particularly, to an improved propulsion system for blending of dynamic and regenerative braking and for low speed current regulation.

Direct current (d-c) electric motors are often used in traction vehicle propulsion applications such as, for example, electric locomotives or transit cars. In such applications motive power is controlled by regulating motor current, typically by means of a control system employing a chopper. The chopper is essentially a controlled switch connected in the energizing circuit of the motor armature and time ratio controlled so as to meter current to the motor by periodically opening and closing. The ratio of the closed time of the chopper to the sum of the closed time and the open time is the duty factor of the chopper. During the closed period of the chopper, the motor armature windings are connected to a power source through a path of relatively low resistance and current builds toward some peak value. During the open period of the chopper, the motor is disconnected from the power source and armature current, circulating through a free wheeling diode, decays from the magnitude attained during the chopper closed time. In this manner, pulses of current are periodically applied to the motor and an average motor current is established. The average motor current tends to remain relatively constant due to the smoothing action of the circuit inductance. In general, the circuit inductance is sufficient to smooth the pulsating current and prevent jerking or lurching of the vehicle so long as the current pulses are supplied at relatively frequent repetition rates, such as for example, 200 or 400 Hz.

An advantage of the d-c electric motor for traction vehicle drives is that the motor may be operated in an electrical retarding or braking mode, when it is desired to decelerate or stop the vehicle, by simply reversing either the direction of field current or the direction of armature current. Generally this reversal is achieved by means of electromechanical contactors, although some recently developed systems have utilized static switching elements. Assuming that the motor has been propelling the vehicle so that an appreciable initial velocity of the vehicle has been achieved, reversal of the field current or reversal of the armature polarity will result in a reversal of power flow and the motor will operate as a d-c generator converting the kinetic energy of the vehicle into electrical energy.

Two types of electrical braking are commonly employed in electrically driven vehicles. These two types are dynamic braking and regenerative braking. In dynamic braking the electrical energy generated by the d-c motor is dissipated in braking resistors which convert it to thermal energy. In regenerative braking the electrical energy is returned to the power source. In vehicles such as electric locomotives or transit cars where electrical power is supplied from an external source, regenerative braking is limited by the receptivity of the external source. For example, rail gaps frequently occur and result in an open circuit between the vehicle and the power source. For this reason, many systems using electrical braking employ a combination of dynamic and regenerative braking and include a control system for blending the two types of electrical braking. Such a blending system is shown, for example, in U.S. Pat. Nos. 3,876,920 and 3,657,625.

The chopper control system of these prior art systems operates in the braking mode in a manner similar too the operation in the propulsion mode, i.e., braking torque is regulated by using the chopper to control the average armature current. In braking, however, the armature generated voltage may rise to several times the magnitude of the source voltage in order to obtain the desired braking torque. Under this condition it is clear that the motor armature cannot be connected directly to the voltage source during a regenerative braking since the difference in potential would result in excessive currents flowing from the motor to the source. Such currents could result in permanent damage to the motor armature if "flashing" were to occur. Accordingly, series resistors are commonly inserted in the motor current path during regenerative braking. One of the series resistors is connected in shunt with the chopper and the other resistors are serially interconnected in the motor current path in a voltage dividing manner. The chopper is then operated to "modulate" the one resistor to provide a continuously variablle impedance. In using this resistive voltage divider approach it is apparent that some means must be provided for removing the additional series connected resistors from the current path if, in order to maintain the desired level of braking torque, the average current is to be kept from diminishing as the vehicle slows down.

In order to remove the resistors from the motor current path it has been common practice to provide power switching means such as electromechanical contactors or cam actuated switches respectively associated with the additional resistors, thereby forming a plurality of resistor stages. By actuating the power switching means, selected resistors may be short-circuited or bypassed. It will be appreciated that staging or short-circuiting of a resistor is only necessary when motor current must be maintained at a magnitude greater than is possible by advancing the chopper duty factor to unity. It is also apparent that since each stage represents a finite resistance, short-circuiting of a stage may result in a current transient, which current transient may result in an unacceptable jerk or lurch of the vehicle. Although it would be possible to minimize this current transient by utilizing many small resistance stages rather than a few large stages, this approach would defeat the overall goal of economizing both cost and space. In addition, this step-changing of resistance results in inefficient operation of the system in that electrical energy which could be returned to the source, i.e., regenerated, is lost in the braking resistors.

One prior art solution to the problem of stepchanging of series resistors is illustrated in U.S. Pat. No. 3,388,306. In this patent each of the series resistors is by-passed by a time ratio controlled thyristor so that each resistor appears as essentially a continuously variable resistor. This arrangement is, however, uneconomical in that each of the SCR's requires its own commutation circuit.

In the propulsion mode of operation it is sometimes desired to operate a traction vehicle at low speeds. Such operation normally requires relatively low motor current. In general the minimum current which can be regulated by a force commutated chopper is that current which is established with the chopper commutation circuit operating but without triggering the main thyristor in the chopper circuit. This problem of minimum current has been solved in the prior art systems by changing the chopper operating frequency to a lower frequency for low current operation. In addition to the economic disadvantages of building a multi-frequency chopper control system, frequency changing is also undesirable because of harmonic transmissions and the difficulties inherent in constructing broad bandwidth power line filters.

It is therefore an object of the present invention to provide a more economical regenerative braking system including a continuously variable braking impedance.

It is a further object of the present invention to provide a system which allows regulation of motor current below the minimum level established by commutation current.

SUMMARY OF THE INVENTION

In accordance with the present invention there is provided a time ratio controlled thyristor power circuit including a main thyristor and associated commutating circuit for a direct current electric traction motor, which power circuit further includes a variable impedance element comprising a thyristor connected in parallel circuit arrangement with a resistor. In one embodiment the variable impedance element is serially connected between a free-wheeling diode and a junction intermediate the main thyristor and the motor armature. In a second embodiment the variable impedance element is serially connected between the motor armature and a junction intermediate the main thryistor and the free-wheeling diode. In both the first and second embodiments the commutating circuit for the main thyristor has an output terminal connected to a junction intermediate the variable impedance element and the motor armature whereby operation of the commutating circuit will effect a commutation of the thyristor in the variable impedance element. In this manner the commutation circuit for the main thyristor serves a dual function and thus eliminates the necessity for a separate commutating circuit for the variable impedance element.

An inventive priority control system is disclosed which operates the variable impedance element and the chopper in a manner such that the variable impedance element is first varied to regulate current. Once the variable impedance element is reduced to a minimum value and can no longer regulate current, the priority control system switches control to the main thyristor while maintaining the variable impedance at its minimum value. For low speed operation of the motor, the variable impedance is chosen to provide sufficient impedance to force the commutation current to be discontinuous at the desired frequency of operation.

BRIEF DESCRIPTION OF THE DRAWINGS

These and other objects, features and advantages of the invention will be better understood by reference to the following detailed description when considered in conjunction with the accompanying drawings in which.

DETAILED DESCRIPTION

Figure 1:
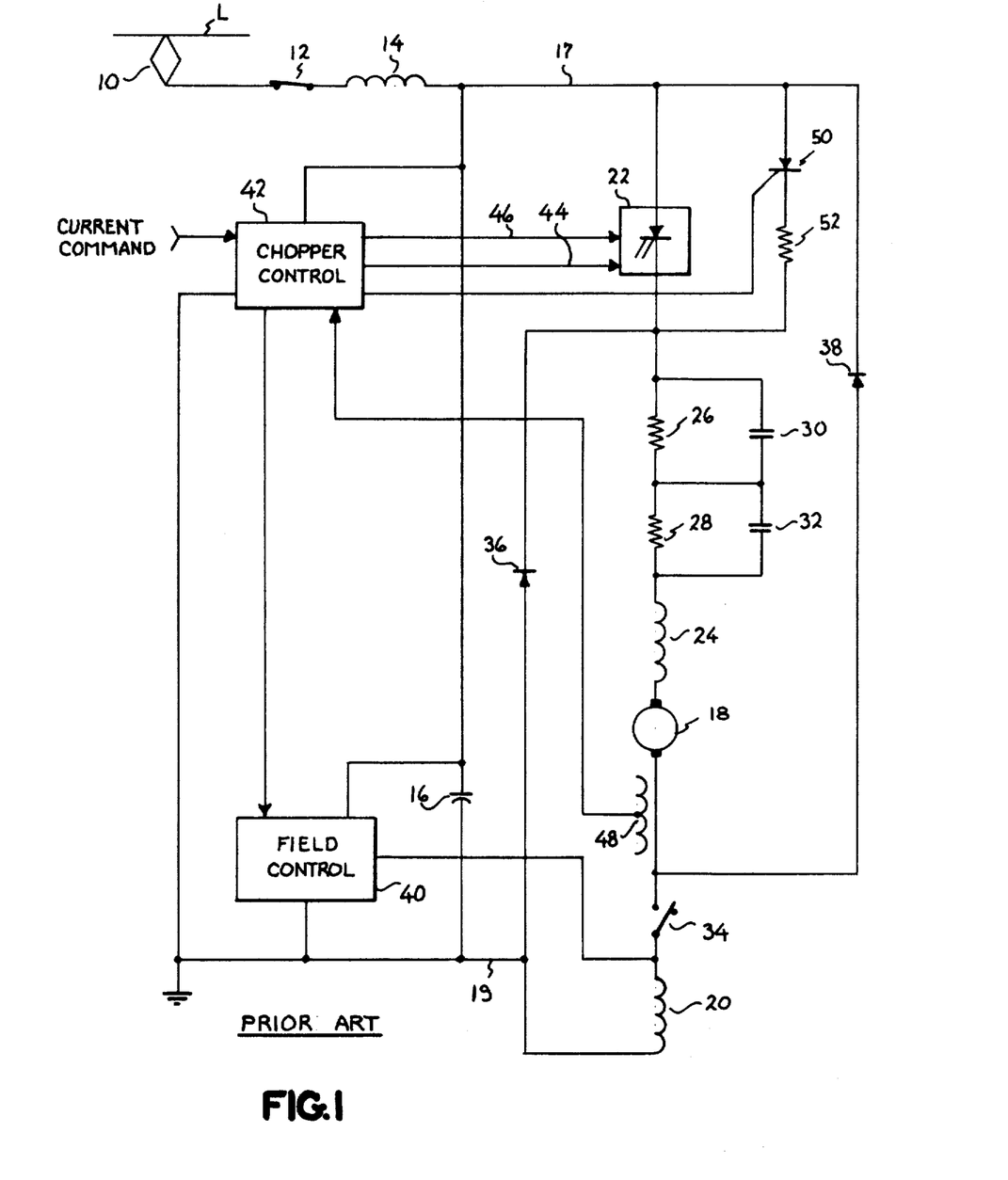
FIG. 1 is a partial schematic diagram of a prior art chopper control system for a d-c electric traction motor.

Referring now to FIG. 1 there is shown a simplified schematic/block diagram of a typical prior art chopper control system for an electric vehicle traction motor control system in which resistor staging for electrical retard is effected by resistors and mechanical contactors. Power for the motor control system is supplied from a power source (not shown) by means of a power line, L, connected to the system through a pantograph arrangement 10 and a line breaker 12. Connected to the control side of line breaker 12 is a line filter comprising an inductor 14 and a capacitor 16. The voltage developed at the junction intermediate inductor 14 and capacitor 16 is applied by means of a bus 17 and a chopper circuit 22 to a traction motor comprising an armature 18 and a field winding 20. A reference bus 19 provides a current return path. The chopper circuit 22 may be of a type well known in the art such as that described in the *SCR Manual*, Fifth Edition, published in 1972 by the General Electric Company, Semiconductor Products Dept., Schenectady, N.Y. Serially connected between chopper circuit 22 and motor armature 18 are a smoothing reactor 24 and first and second current limiting resistors 26 and 28. By-pass contacts 30 and 32 are connected in parallel with corresponding resistors 26 and 28 respectively. Contacts 30 and 32 are in a normally closed position during electrical propulsion or motoring and are arranged to open when electrical braking is commanded. Motor armature 18 is connected to field winding 20 by means of a first conduction means illustrated as a motor-brake switch 34 adapted to open and separate armature 18 from field winding 20 in the electrical brake mode. A second conduction means illustrated as a free-wheeling diode 36 connected in parallel with the series combination of motor armature 18 and field winding 20, provides a current path for armature current and filed current during the non-conducting or off-time of chopper circuit 22. A third conduction means illustrated as a braking diode 38 provides an armature current path during electrical braking when motor-brake switch 34 is in the open position illustrated in FIG. 1.

A field control circuit 40 such as that described in U.s. Pat. No. 3,866,098 — Weiser issued Feb. 11, 1975 and assigned to the General Electric Company, is connected in parallel with field winding 20 and provides means for field weakening while in the motoring mode and for controlling braking current through field current control during the electrical braking mode. Armature current is regulated by chopper circuit 22 which circuit 22 functions in a manner well known in the art to meter power to the traction motor by periodically opening and closing. Control of chopper circuit 22 is effected by chopper control circuit 42 of a type well known in the art such as that described in the aforementioned GE *SCR Manual* and U.S. Pat. No. 3,866,098. Chopper control circuit 42 provides "on" commands to initiate conduction of chopper circuit 22 by means of line 44 and also supplies "off" commands to terminate conduction of circuit 22 by means of line 46.

The duty factor or per-cent-on-time of chopper circuit 22 is determined by a CURRENT COMMAND signal implemented by the vehicle operator from a control console (not shown) in conjunction with a feedback signal which compares the actual current in the motor circuit to the commanded current. The feedback signal indicating actual current is derived from a current transducer 48 coupled to the motor armature circuit. The output of the current transducer 48 is connected to an input terminal of control circuit 42. Current transducer 48 may be any one of a number of well known d-c current measuring devices such as, for example, a Hall effect device, a current shunt or a current measuring reactor. A more detailed description of a chopper controlled motor system may be had by reference to copending application Ser. No. 641,217 filed 12/16/75 and assigned to the General Electric Company.

For purposes of illustration the motor circuit is shown in the braking mode, i.e., motor brake switch 34 is in the brake position thereby separating the armature and field circuits. In the braking mode the traction motor operates as a generator with voltage being generated by armature 18 as a function of current in field winding 20 and the rotational speed of the armature. The current from armature 18 circulates through the diode 38, chopper circuit 22, motor smoothing reactor 24, resistor 26 and resistor 28 loop. However, during the non-conducting time of chopper circuit 22 the current generated by armature 18 must either be absorbed in capacitor 16 or be forced back into the power line L thereby resulting in what is known as regenerative braking. If for some reason the power line L is unable to absorb this current or if switch 12 is open the current will be unable to flow back into the power line and will tend to over charge capacitor 16 very rapidly and may result in over voltage stressing of the devices connected to the filter capacitor. In order to prevent this occurrence dynamic braking rather than regenerative braking is employed when braking current cannot be absorbed by line L. Dynamic braking is achieved by forcing armature current to flow through the series combination of an SCR 50 and a dynamic braking resistor 52, the series combination being connected in parallel circuit arrangement with chopper circuit 22. SCR 50 is gated into conduction and maintained in that state by a gating signal produced by control circuit 42 when dynamic brake is required. During dynamic braking chopper circuit 22 serves to modulate the resistance of resistor 52 thereby controlling the average level of braking current. When chopper circuit 22 is operating at maximum duty factor resistor 52 is essentially short circuited and no further current control can be effected by means of chopper circuit 22, since vehicle speed is decreasing with a corresponding decrease of armature current and braking torque. At this time armature current and thus braking torque can be maintained at the desired level by short-circuiting a selected one of the series resistors 26 and 28 and reducing the duty factor of chopper circuit 22. Accordingly, a control circuit function is provided for sensing when chopper circuit 22 is at a maximum duty factor or maximum "on" time and for implementing the closure of by-pass contacts 30 or 32 to short out the corresponding series resistor 26 or 28. This control function is commonly implemented within chopper control circuit 42 in a manner such as that illustrated in U.S. Pat. No. 3,515,970 — Weiser, issued June 2, 1970, and assigned to the General Electric Company. Armature current and thus braking effort is therefore controlled by gradually increasing the duty factor of chopper circuit 22 to a maximum level, shorting a braking resistor while reducing the duty factor to a minimum level and repeating the process until all braking resistors have been by-passed.

If the power line L is receptive, current generated by armature 18 during electrical braking may be forced to flow into line L by well known regenerative braking techniques. In particular, for high speed brake both chopper 22 and dynamic brake SCR 50 are maintained in an off condition and armature current circulates from reference bus 19 through diode 36, braking resistors 26 and 28, motor reactor 24, armature 18, diode 38, filter reactor 14, line switch 12 and pantograph 10 to line L. During high speed brake armature current is generally limited only by resistors 26 and 28 although, in some applications, armature current may be further limited by reduction of field current. Accordingly, resistors 26 and 28 are generally selected so that the voltage drop across these two resistors represents the desired difference between armature voltage and source voltage at full field current and rated brake current at a predetermined speed. As speed drops below the predetermined level, braking current and thus braking torque can be maintained by reducing the impedance reflected to the motor armature. This impedance reduction is commonly achieved by operating chopper circuit 22 so that a portion of the armature generated current flows around the armature loop rather than to line L. This action makes the average voltage of power line L, as seen by the armature circuit, become less and less as the chopper duty factor is increased. Therefore, less current is forced back to the source until finally the chopper is a 100% duty factor and regenerative current is zero. At this point contactor 30 is closed and the chopper duty factor is reduced to approximately zero percent so that maximum regenerative current is again fed back into line L.

Figure 3:
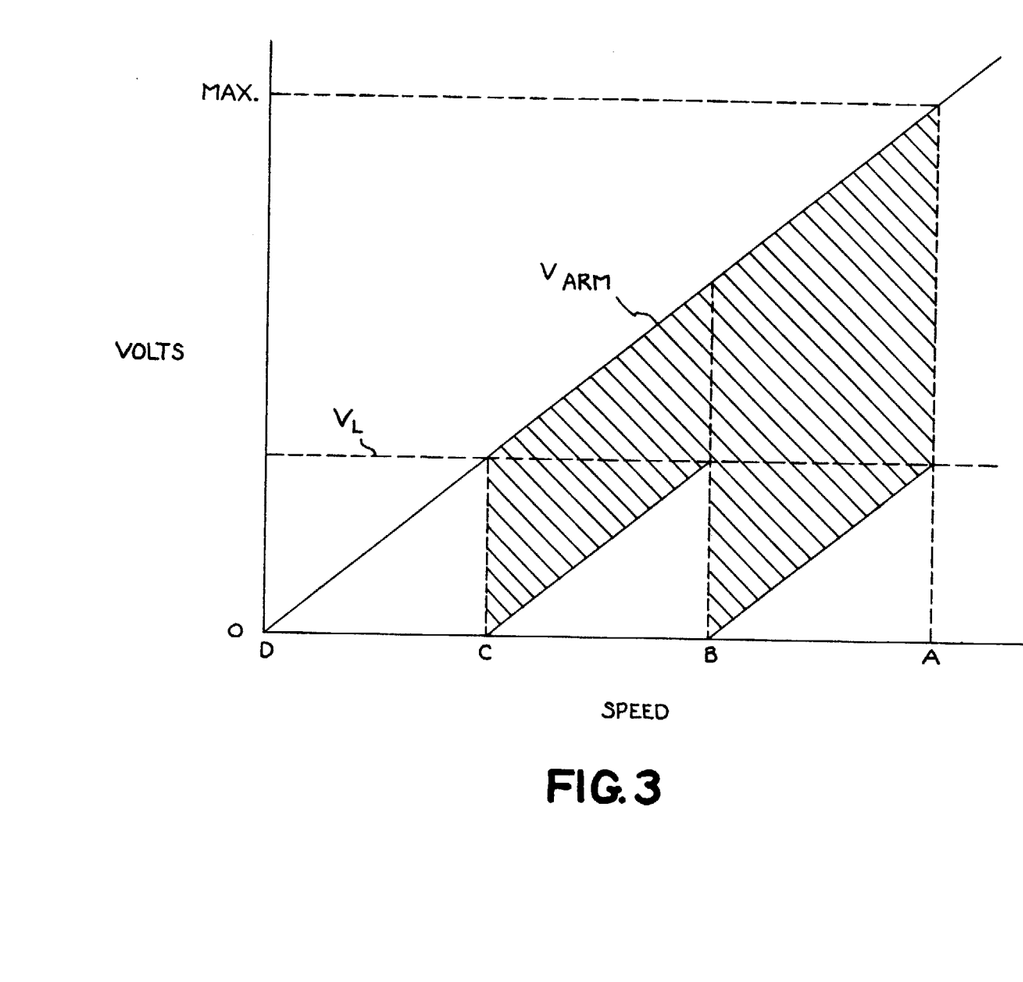
FIG. 3 is a graph plotting armature generated volts versus speed during electrical braking of a d-c electric traction motor.

A better understanding of the above operation may be had by reference to FIG. 3. For a constant field current, motor armature voltage decreases substantially linearly with decreasing speed. Assuming source voltage of power line L relatively constant at $V_L$, the armature generated voltage is matched to the source voltage by operating chopper circuit 22 to maintain average armature current constant. As speed decreases from point A to point B, the duty factor of chopper circuit 22 is increased from zero to 100 percent. At point B contactor 30 is closed thereby bypassing resistor 26 and the duty factor of chopper 22 is returned to zero. The duty factor of chopper 22 is then increased from point B to point C where contactor 32 is closed and resistor 28 by-passed. From point C to point D the chopper duty factor is again increased from zero to 100 percent in order to maintain constant armature current down to substantially zero speed. Obviously the impedance of armature 18, motor reactor 24, chopper 22 and diode 38 will tend to force the current to become non-linear and deviate from the desired constant value as speed approaches zero.

It will be apparent that the shaded area of FIG. 3 represents energy generated by armature 18 and dissipated as heat in resistors 26 and 28. It will also be apparent that some of this energy could be regenerated into power line L by simply increasing the number of braking resistor stages and that for an infinite number of stages all that energy below the $V_L$ line and bounded by the $V_{arm}$ line could be regenerated. Since an infinite number of stages represents a continuously variable resistance, it is apparent that a continuously variable series resistance could be utilized to control current between point A and point C and result in regeneration of the energy below line $V_L$ which energy has heretofore been lost in discrete braking resistors. A system of this nature is described in U.S. Pat. No. 3,388,306. However, the system described in U.S. Pat. No. 3,388,306 is not economically sound since it merely replaces contactors with thyristors on a one-for-one basis and requires that each thyristor be provided with a commutating circuit and a control circuit.

Figure 2:
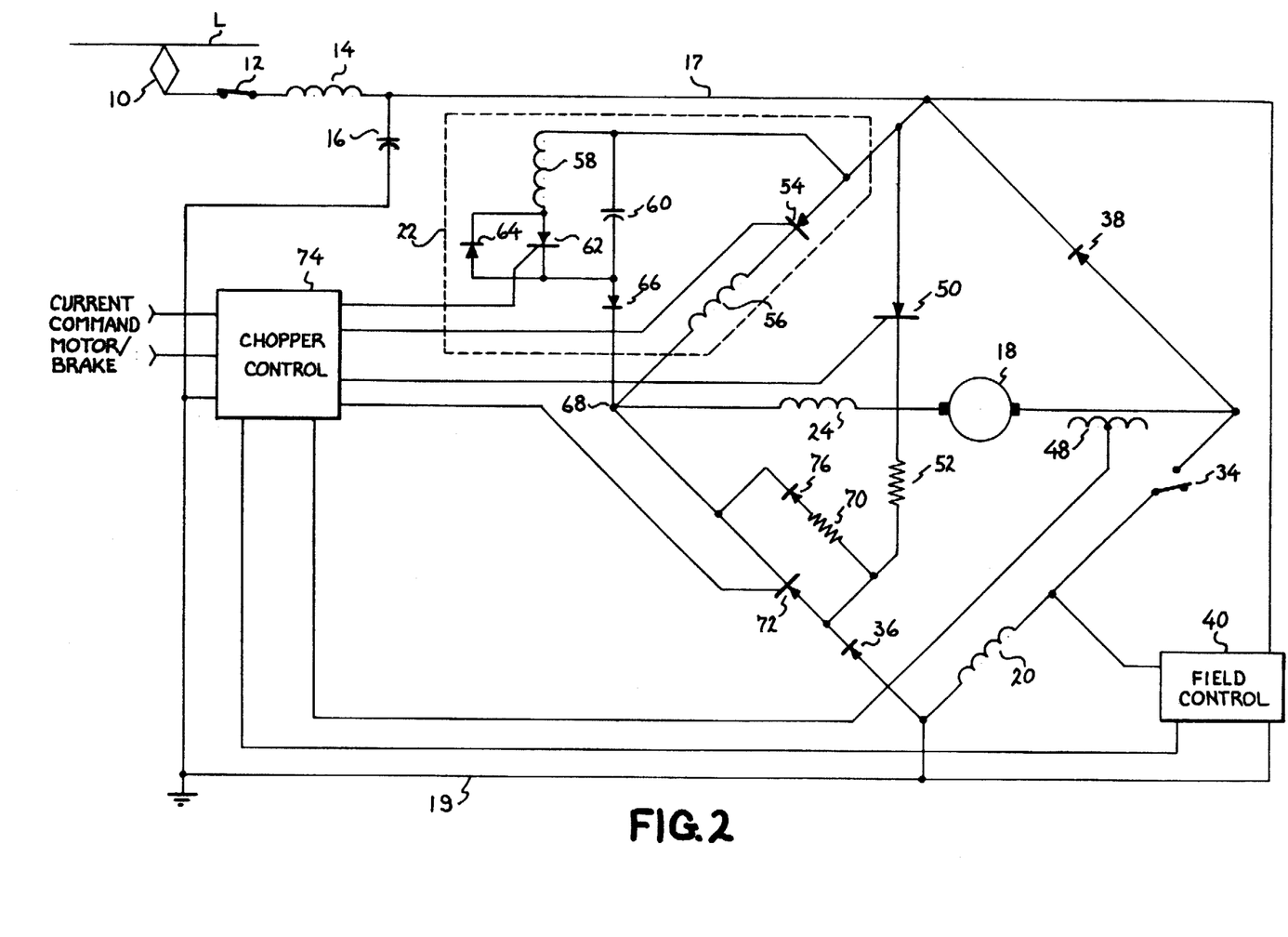
FIG. 2 is a modification of the partial schematic diagram of FIG. 1 incorporating the present invention.

A preferred embodiment of the present invention is illustrated in FIG. 2 and provides a system in which an increased amount of energy may be regenerated without requiring additional commutating or control circuits for operating a continuously variable impedance. Although the system of FIG. 2 is shown in a bridge configuration, it will be appreciated that with the exception of the inventive braking control, FIG. 2 is substantially equivalent to FIG. 1 and thus like numbers are indicative of like components. In FIG. 2 chopper circuit 22 is more definitively shown and includes a load current carrying or main thyristor 54 and a commutating reactor 56 serially connected in a first side of the bridge arrangement between bus 17 and a first terminal of motor reactor 24. Connected in parallel circuit arrangement with thyristor 54 and reactor 56 is a commutating circuit comprising an inductor 58, a capacitor 60, a thyristor 62 and diodes 64 and 66. Inductor 58 has a first terminal connected to bus 17 and a second terminal connected to an anode of thyristor 62. A cathode terminal of thyristor 62 is connected to an anode terminal of diode 66. A cathode terminal of diode 66 is connected to a junction 68 intermediate reactor 56 and reactor 24, the cathode terminal of diode 66 thus acting as an output terminal for the commutating circuit. Capacitor 60 is connected between bus 17 and the anode terminal of diode 66. Diode 64 is connected in reverse parallel arrangement with thyristor 62 and provides a reverse current path for commutating thyristor 62.

Braking diode 38 is connected in a second side of the bridge arrangement between bus 17 and one terminal of armature 18. Motor-brake switch 34 and field winding 20 are serially connected in a third side of the bridge arrangement between the one terminal of armature 18 and bus 19. Free wheeling diode 36 is connected in a fourth side of the bridge arrangement between bus 19 and junction 68. Although the traction motor has been illustrated as a series motor, i.e., field winding 20 is serially connected to armature 18 during motoring, it will be appreciated that the invention is equally applicable to a separately excited or shunt wound motor.

Figure 4:
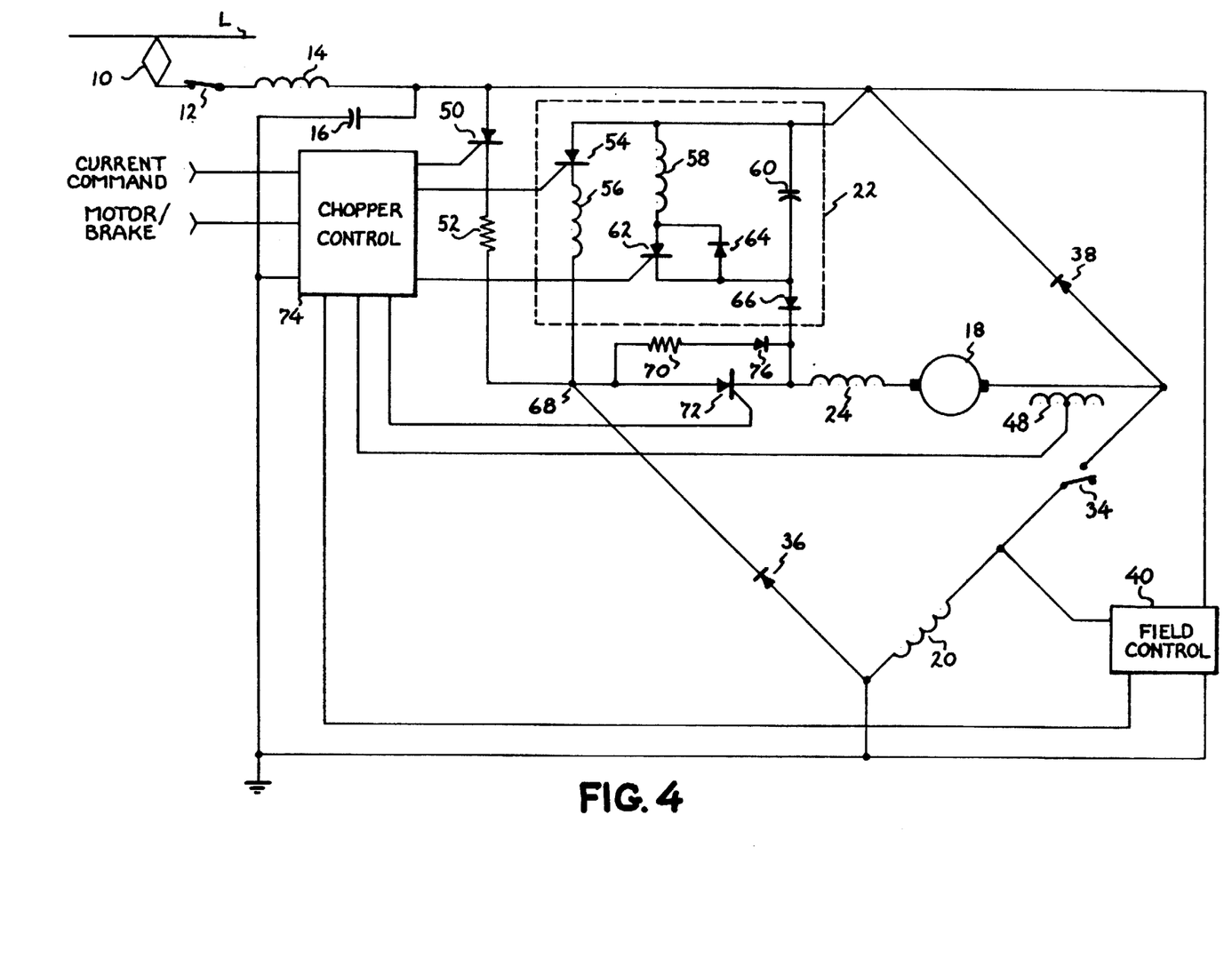
FIG. 4 is a modification of FIG. 2 showing an alternate embodiment incorporating the present invention.

As can be seen the staging resistors 26 and 28 of FIG. 1 have been eliminated from the present invention as shown in FIG. 2. The present invention provides armature current control by means of a variable impedance circuit comprising a resistor 70 and a parallel connected thyristor 72 connected between the free wheeling diode 36 and motor reactor 24. In a preferred embodiment the parallel combination of thyristor 72 and resistor 70 is connected in the fourth side of the bridge arrangement between diode 38 and junction 68. However, as shown in FIG. 4 the combination may also be connected between junction 68 and motor reactor 24, in which case the cathode terminal of diode 66 would be reconnected to the cathode terminal of thyristor 72 at the reactor 24 junction.

In some applications it has been found that a more rapid commutation of thyristor 72 is required. In these applications there may be provided a diode 76 serially connected with resistor 70. When a commutating voltage is applied at the cathode terminal of thyristor 72, diodes 36 and 76 are reverse biased and cease conducting. Diode 76 assures that a sufficient portion of the commutating voltage is impressed on thyristor 72 to thereby assure rapid commutation.

It will be apparent that the chopper control circuit 42 of FIG. 1 need be modified in order to provide control signals to thyristor 72 in addition to the previously supplied control signals to chopper circuit 22, thyristor 50 and field control circuit 40. Such a modified control circuit is illustrated as block 74 in FIG. 2. Innumerable such modifications to accomplish the operation of the present invention are possible and thus implementation of such logic circuits are not believed necessary to an understanding of the present invention. However, in its simplest form for regenerative braking only, the modification would encompass an AND gate (not shown) connected to AND the gating signals to thyristor 54 with a MOTOR/BRAKE signal and an OR gate (not shown) connected to OR the gating signal to thyristor 72 with the MOTOR/BRAKE signal, assuming that the motoring mode is indicated by a logic 1 MOTOR/BRAKE signal. This modification would assure that during the motoring mode thyristor 72 is maintained in a conductive state and thus that resistor 70 has no effect on armature current, but that during the braking mode thyristor 54 is maintained non-conductive while thyristor 72 is utilized to modulate the effective impedance of resistor 70. Of course such an over simplified modification would be ineffective for low speed regenerative braking or for dynamic braking but further modifications to accomplish these functions and others are well within the knowledge of those having ordinary skill in the art. A modification suitable for effecting regenerative brake control and low speed motoring control is described infra with regard to FIG. 5.

The operation of the system of FIG. 2 during the motoring mode above the break point for low speed operation to be described infra and with switch 34 in the closed position in similar to the operation of the system of the prior art shown in FIG. 1 since substantially continuous gating signals are applied to thyristor 72 to maintain it in a conductive mode. Operation in a braking mode varies as a function of the type of braking implemented. Considering first a condition of high speed brake with the supply being receptive to regenerative power, control circuit 74 interrupts the gating signals to thyristor 54 thus terminating the application of power to armature 18. Switch 34 is opened thereby separating the armature and field circuits so that field current may be maintained independent of armature current. During the initial portion of the regenerative brake mode, when armature generated voltage is much higher than source voltage, excess braking energy will be absorbed in resistor 70 since the armature current path now includes armature 18, diode 38, inductor 14, switch 12, pantograph 10, source L, diode 36, resistor 70 and reactor 24. As speed decreases the armature generated voltage decreases proportionately and a match between the motor system output voltage and the source voltage is maintained by continuously modulating the impedance of resistor 70 through the control of the duty factor or percent-on-time of thyristor 72. In the present invention the control of the duty factor of thyristor 72 is achieved by applying gating signals to thyristor 72 to render it conductive and by applying gating signals to thyristor 62 is chopper circuit 22 in order to render thyristor 72 non-conductive. Gating of thyristor 62 will result in a voltage approximately equal to twice the source voltage being applied to the cathode terminal of thyristor 72 and will provide an armature current path through the chopper circuit 22 commutating circuit for a period sufficient to allow thyristor 72 to become non-conductive. It can therefore be seen that the present invention utilizes an existing commutating circuit to control thyristor 72 and obviates the need for an additional commutating circuit as was required by the prior art systems.

Once the armature generated voltage has fallen below the magnitude of the source voltage, thyristor 72 is maintained in a conductive mode and the system operates similarly to the systems of the prior art, i.e., main thyristor 54 is periodically gated on to short-circuit the armature 18 and allow current to build up. When thyristor 54 is commutated off the inductive nature of the system causes current to continue to flow through armature 18 in the same direction and, in the absence of the path through chopper circuit 22, the armature current is forced to flow into the voltage source L.

If, for some reason, power line L is non-receptive to regenerative braking energy, this energy must be expended in braking resistors through the use of dynamic braking techniques. In high speed dynamic brake thyristor 72 is operated similarly to its operation in regenerative braking. However, thyristor 50 is maintained conductive during this mode and resistor 52 acts as an energy sink for the braking energy developed by armature 18. When the vehicle speed and armature generated voltage have dropped to the point at which modulation of resistor 70 by thyristor 72 can no longer provide the desired braking effort, i.e., thyristor 72 is continuously conductive, low speed dynamic braking is initiated. In low speed dynamic brake the impedance of resistor 52 is varied by modulating its impedance by operation of chopper circuit 22 in a manner well known in the art.

In FIG. 4 the commutating voltage developed by chopper circuit 22 is applied to reverse bias the series combination of thyristor 54 and thyristor 72. During motoring both of these thyristors are conducting; however, the commutating circuit of chopper 22 is connected in parallel with the series combination and is not required to carry any additional load current in order to commutate both thyristor 54 and thyristor 76 simultaneously. A better understanding of the operating modes of thyristors 50, 54, and 72 may be had by reference to the following chart in which the entries therein represent the duty factor of the corresponding thyristor for typical motoring and braking intervals of a propulsion system embodying our present invention. High-speed braking refers to the condition wherein armature generated voltage exceeds line voltage and low speed braking refers to the condition wherein armature generated voltage is less than or equal to line voltage.

| THYRISTOR OPERATING CONDITION | 54 | 50 | 72 |
|---|---|---|---|
| MOTORING | Variable | 0 | 100 |
| REGEN BRAKING | | | |
| Hi-Speed | 0 | 0 | Variable |
| Lo-Speed | Variable | 0 | 100 |
| DYNAMIC BRAKE | | | |
| Hi-Speed | 0 | Variable | Variable |
| Lo-Speed | Variable | Variable | 100 |

It is noted that in both the arrangement of FIG. 2 and the arrangement of FIG. 4 that the dynamic braking resistor 52 is connected between thyristor 50 and the anode terminal of thyristor 72. This arrangement places the dynamic brake resistor 52 in series circuit with the combination of thyristor 72 and resistor 70 during dynamic braking so that the armature generated voltage is dropped across both resistors. Had resistor 52 been connected to the cathode terminal of thyristor 72, the full armature voltage would have been developed across this resistor thereby requiring a higher wattage rating in order to dissipate energy at high armature speeds. Furthermore, such a connection would not have allowed resistor 70 to be used as a continuously variable impedance for controlling braking current in dynamic brake.

In addition to the use of the present inventive power circuit in regenerative braking, the circuit is also useful for regulating motor current to achieve low speed operation or smooth acceleration from standstill. As is well known a chopper circuit regulates motor current by time ratio control, i.e., by varying the time-average value of current applied to the motor. The time-average value of current can be varied by either changing the frequency of the current pulses applied to the motor while holding the time duration of the pulses substantially constant or by varying the time duration of the current pulses while holding the frequency constant. A combination of these two methods could also be used. However, in order to minimize the size of effective inductance in the motor circuit and to minimize the physical size of the direct current line filter components such as inductor 14 and capacitor 16, it is desirable to operate the chopper circuit at as high a frequency (within the normal operating range) as the minimum per cent on time or duty factor will allow to attain the desired regulated current level. As is well known, the minimum duty factor for a chopper circuit is determined by the cycle time of the chopper commutation circuit, i.e., minimum duty factor is attained when the commutation circuit operates without operating the main thyristor. In turn, the minimum duty factor for the commutation circuit is determined by the characteristics of the thyristors to be commutated. The more current and the higher the operating voltage, the longer the required commutating or turn-off time. With reference to the commutation circuit of FIG. 2, the circuit components which are sized to achieve the required minimum commutation pulse duration are the inductor 58 and the capacitor 60.

When the chopper circuit, i.e., the main thyristor 54 and/or the commutating thyristor 62, is triggered a voltage substantially equivalent to the available line voltage is applied across the motor armature 18, field winding 20 and motor smoothing reactor 24. At zero speed the motor CEMF is zero and the motor peak current is determined by the magnitude of the applied line voltage divided by the impedance of the series combination of armature 18, field winding 20 and reactor 24. Because of the inductive nature of this impedance the current tends to build towards the peak current level as a function of the inductive/resistive ratio, i.e., the L/R time constant. When the thyristors are commutated off the motor current circulates through armature 18, field winding 20, reactor 24, free-wheeling diode 36 and thyristor 72. Over several cycles of operation the current through the motor armature 18 and field winding 20 builds up to a steady state value where the rise in current during the time the thyristors 54 or 62 are conducting is equal to the fall in current during their non-conducting state.

At initial starting of the traction motor or during very low speed operation, the required motor current magnitude may be less than the minimum level which operation of the commutating thyristor 62 will generate in the motor. In order to reduce the motor current under these conditions, the prior art systems have resorted to frequency control of the chopper circuit. Such a system is shown in co-pending application Ser. No. 638,520, filed Dec. 8, 1975, and assigned to the General Electric Company. The present invention provides a means for regulating motor current at very low levels without the necessity of changing the chopper circuit operating frequency.

As discussed above, when neither the thyristor 54 nor the thyristor 62 are in a conducting state, current free-wheels through the closed current path including the armature 18, field winding 20, reactor 24, diode 36 and thyristor 72. If the thyristor 72 is rendered non-conductive during this time, the circulating current will be forced through the resistor 70 and diode 76. The resistance of resistor 70 is therefore added to the impedance in the current path thus changing the L/R ratio. The free-wheeling current in the motor circuit at a time $t$ is defined by the well known relationship $i = I_p e^{-[Rt/L]}$, where $I_p$ represents the peak current attained during the chopper conducting time. By increasing the resistance R in the current path, the current can be made to decay at a faster rate and thus reduce the average level of current in the motor. In the illustrated power circuit the thyristor 72 can be time ratio controlled to vary the effective resistance of resistor 70 and thus regulate the motor current to a desired magnitude.

Figure 5:
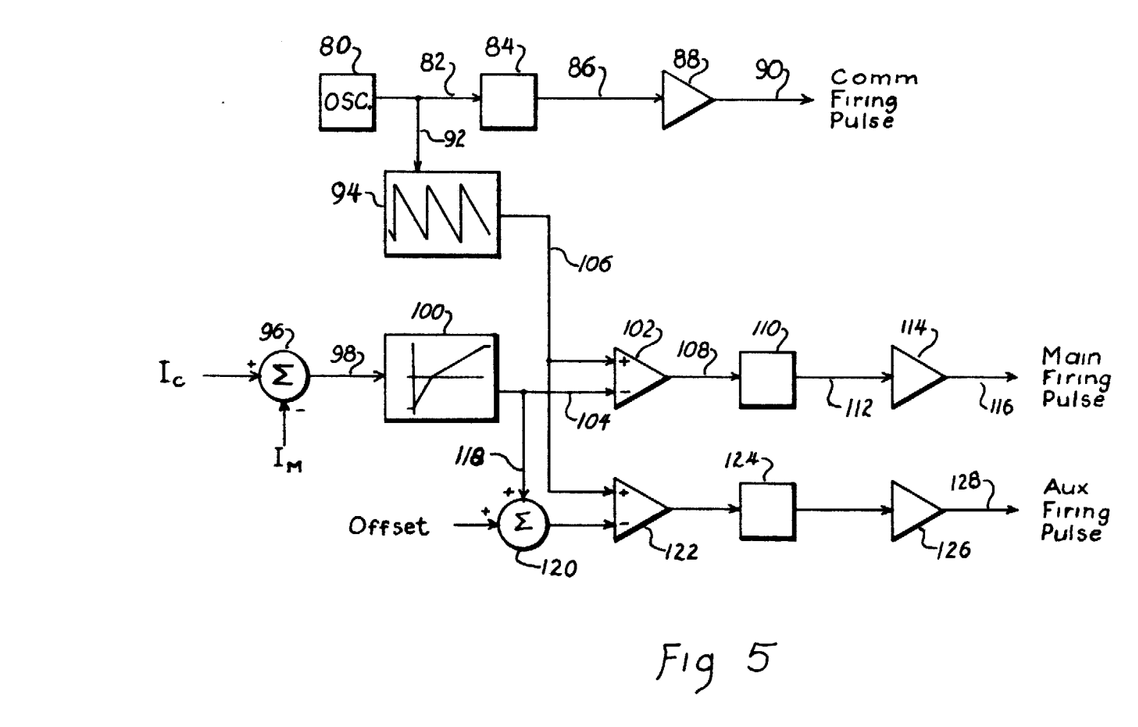
FIG. 5 is a block diagram of a priority control system for controlling the inventive propulsion system.

Referring now to FIG. 5 there is shown a diagram of a circuit suitable for controlling the thyristor 72 in conjunction with the chopper circuit 22 in order to regulate motor current at relatively low magnitudes. An oscillator 80 supplies clock signals at a desired frequency, e.g., 400 Hertz. The clock signals are connected via a line 82 from an output terminal of oscillator 80 to an input terminal of a monostable multivibrator 84 of a type generally known as a one-shot. Multivibrator 84 responds to a clock signal by supplying a single pulse having a predetermined time duration or pulse width. Pulses from multivibrator 84 are coupled via a line 86 from an output terminal of multivibrator 84 to an input terminal of a gate driver circuit 88. Driver circuit 88 is essentially a current amplifier which increases the power level of the pulse from multivibrator 84 to a level sufficient to trigger a thyristor. The amplified pulses developed at an output terminal of driver circuit 88 are the commutating thyristor firing pulses and are coupled via line 90 to the gate terminal of thyristor 62. Clearly the thyristor 62 is triggered each time a clock signal is produced by oscillator 80.

Clock signals from oscillator 80 are also coupled via line 92 to an input terminal of a ramp function generator 94. Generator 94 is adapted to reset on the leading edge of each clock signal and thereafter to provide a voltage output signal at a positive voltage level, e.g., 10 volts, which signal decreases substantially linearly to some base level, e.g., zero volts. The output signal will remain at the base level until the next succeeding clock signal. Obviously in a working embodiment the attainment of a zero volt base level will coincide with the occurrence of the next succeeding clock signal whereby the ramp function is a continuous function over the period between clock signals.

The circuit for generating the gating pulses for the main thyristor 54 and the auxiliary thyristor 72 is responsive to a desired current command signal $I_c$ and a motor current feedback signal $I_m$ from CMR 48. The $I_c$ and $I_m$ signals are coupled to a summing junction 96 which combines the two signals to produce an error signal proportional to the difference therebetween. This error signal is connected via a line 98 from an output terminal of summing junction 96 to an input terminal of a stabilizing amplifier 100. Amplifier 100 is an integral plus proportional amplifier of a type well known in the motor control art and includes input filtering to eliminate transients and lead-lag compensation networks to compensate for the inductive and capacitive nature of the motor and motor leads. The stabilizing amplifier is tailored to the particular motor circuit being controlled but typically has relatively high gain at low frequency and low gain at high frequency with a transfer function of the type $[K(S/\tau_1+1)]/[S/\tau_2+1)(S/\tau_3+1)]$ where K represents the gain of the amplifier and $\tau_1$, $\tau_2$ and $\tau_3$ are time constants which establish its frequency response. The signal developed by amplifier 100 is a compensated form of the command signal $I_c$ as modified by the feedback signal $I_m$ and preferably operates from a negative 10 volts at zero error (or when motor current is of greater magnitude than the commanded current) to a maximum value of positive 10 volts when the commanded current exceeds the actual motor current. Although the graph shown within block 100 indicates a preferred response function wherein the amplifier gain is higher over the initial portion of the response function, it may be preferable in some motor systems to provide uniform gain over the full range of the amplifier.

The compensated signal is coupled from an output terminal of amplifier 100 to a first input terminal of a comparator 102 via a line 104. A line 106 connects an output terminal of ramp generator 94 to a second input terminal of comparator 102. The comparator 102 is adapted to produce a relatively low voltage, e.g., zero volts, at an output terminal so long as the ramp function signal on its second input terminal is of greater magnitude than the signal at its first input terminal. However, whenever the ramp function signal is less than the compensated signal, comparator 102 changes state and produces an output signal of relatively high voltage, e.g., 6 volts.

A line 108 connects an output terminal of comparator 102 to an input terminal of a monostable multivibrator 110 which may be identical to multivibrator 84. Multivibrator 110 produces an output pulse of predetermined time duration when a signal applied to its input terminal transitions from a low to a higher voltage. Accordingly, when comparator 102 changes state going from a relatively low output voltage to a relatively high output voltage, multivibrator 110 is triggered and produces an output pulse.

An output terminal of multivibrator 110 is coupled via a line 112 to an input terminal of a gate driver circuit 114 which may be identical to gate driver circuit 88. An output terminal of driver circuit 114 is coupled via line 116 to the gate terminal of main thyristor 54. Thus it can be seen that when the compensated signal amplitude exceeds the ramp function signal amplitude, a trigger or firing pulse is produced at the output terminal of gate driver circuit 114 and coupled via line 116 to the gate terminal of thyristor 54.

The compensated signal developed at the output terminal of stabilizing amplifier 100 is also coupled via line 118 to a first input terminal of a summing junction 120. A second input terminal of summing junction 120 is connected to receive an offset bias voltage from a voltage source (not shown). The offset bias voltage is of a polarity to add to and increase the magnitude of the compensated signal on line 118. The offset compensated signal is then coupled to a first input terminal of a comparator 122 which may be identical to comparator 102. A second input terminal of comparator 122 is connected to the output terminal of ramp generator 94 via an extension of line 106. Comparator 122 thus functions to compare the ramp function signal with the offset compensated signal and, as with comparator 102, to produce a positive going state change signal when the amplitude of the offset error signal exceeds the amplitude of the ramp function signal.

An output terminal of comparator 122 is connected to a pulse forming and gate driver circuit comprising a monostable multivibrator 124 and a current amplifier 126. Clearly the combination and the operation of multivibrator 124 and amplifier 126 may be identical to that of multivibrator 110 and driver circuit 114. The output signal developed by amplifier 126 is coupled via line 128 to the gate terminal of auxiliary thyristor 72 in order to gate that thyristor into conduction.

The circuit of FIG. 5 is a priority control circuit which operates to cause a gating signal to be applied via line 128 to auxiliary thyristor 72 so long as operation of that thyristor is sufficient to maintain the error signal less than a predetermined magnitude. In practice the control will operate thyristor 72 until the duty factor of that thyristor reaches 100 percent or a full-on condition. At that point the error signal amplitude becomes sufficient to cause comparator 102 to begin changing state so that the main thyristor 54 is triggered by signals from gate driver 114. The small offset bias voltage introduced into summing junction 120 forces the control loop for auxiliary thyristor 72 to function preferentially over the control loop for main thyristor 54. As indicated above the compensated signal from amplifier 100 varies from negative 10 volts for zero error to positive 10 volts for relatively large error. By setting the offset bias to positive 10 volts, the signal into the inverting input terminal of comparator 122 will be substantially at zero volts for zero error. As the compensating voltage increases, the voltage at the inverting input terminal of comparator 122 increases and, sometime during the decrease in the ramp function signal, will be larger than the ramp function signal thus generating a firing pulse to thyristor 72. The larger the compensated signal, the earlier in the cycle that thyristor 72 is triggered. Once the compensated signal amplitude at the output terminal of amplifier 100 reaches approximately zero volts, thyristor 72 is full-on. An increase in the compensated signal above zero volts then causes comparator 102 to change state in each ramp function cycle so that gate pulses are applied via line 116 to the gate terminal of main thyristor 54. As was noted previously, the commutation thyristor 62 is gated at each clock pulse so that thyristors 54 and 72 are commutated off each time the ramp function is reset.

It will be apparent that the circuit of FIG. 5 will also function in regenerative braking to control the operation of thyristor 72 and thyristor 54. In braking the current command signal $I_c$ will call for some level of regenerative braking current. So long as the armature CEMF is greater than line voltage, the armature 18 will be capable of providing the required magnitude of current without the operation of main thyristor 54. Accordingly, the priority control circuit will time ratio control the auxiliary thyristor 72 to regulate armature current to the commanded level. When thyristor 72 is being operated at maximum duty factor, i.e., when the variable impedance introduced by resistor 70 and thyristor 72 is at a minimum level, the control circuit will be supplying gating pulses to the main thyristor 54 while maintaining thyristor 72 at maximum duty factor. Thyristor 54 is thereafter time ratio controlled to maintain the current at the commanded magnitude.

It can thus be seen that the present invention provides a continuously variable impedance which allows an increased amount of energy to be regenerated to a voltage source and achieves this desirable objective without requiring additional commutating circuits as was taught by the prior art. Furthermore, the present invention provides a method for regulating motor current below the minimum level normally established by the chopper commutation circuit through introduction of impedance in the armature current path.

While the principles of the invention have now been made clear in an illustrated embodiment there will be immediately obvious to those skilled in the art many modifications, constructions and arrangements used in the practice of the invention which are particularly adapted for specific environments and operation requirements without departing from these principles. The appended claims are therefore intended to cover and embrace any such modifications, subject only to the true spirit and scope of the invention.

What we claim as new and desire to secure by Letters Patent of the United States is:

1. A d-c electric traction motor propulsion system comprising:
   a. a bridge circuit having first, second, third and fourth sides, said first and third sides being opposite each other;
   b. a d-c power source having a first terminal connected to a junction intermediate said first and second sides and having a second terminal connected to a junction intermediate said third and fourth sides;
   c. a d-c electric traction motor including an armature, said armature having one terminal thereof connected to a junction intermediate said second and third sides;
   d. a chopper circuit including a main thyristor and a commutating circuit, said main thyristor being connected in said first side for metering power to said armature;
   e. first conduction means connected in said third side for providing an armature current path only during electrical propulsion of said motor;
   f. second conduction means connected in said fourth said for providing an armature current path when said chopper circuit is non-conductive;

g. third conduction means connected in said second side for providing an armature current path only during electrical braking of said motor; and h. continuously variable impedance means serially connected between said second conduction means and another terminal of said armature, an output terminal of said commutating circuit being connected to a junction intermediate said variable impedance means and said armature.

2. The system as defined in claim 1 wherein said variable impedance means comprises a resistor and a parallel connected auxiliary thyristor.

3. The system as defined in claim 2 wherein said variable impedance means is connected in said fourth side.

4. The system as defined in claim 2 wherein said varible impedance means is connected between said armature and a junction intermediate said first and fourth sides.

5. The system as defined in claim 2 and including a dynamic brake thyristor and a dynamic brake resistor serially connected betweeen said first terminal of said power source and a junction intermediate said third conduction means and said variable impedance means.

6. The system as defined in claim 2 and including fourth conduction means serially connected with said resistor in parallel with said auxiliary thyristor.

7. The system as defined in claim 2 wherein said motor includes a field winding serially connected in said third said.

8. A d-c electric traction motor control system comprising:

a. a d-c power source having first and second terminals;

b. a d-c electric traction motor including an armature winding and a field winding;

c. a chopper circuit including a main thyristor and a commutating circuit, said main thyristor being connected between said first terminal of said power source and a first terminal of said armature winding;

d. continuously variable impedance means including an auxiliary thyristor and a resistor connected in parallel therewith;

e. a free-wheeling diode serially connected with said continuously variable impedance means between said second output terminal of said power source and said first terminal of said armature winding;

f. a braking diode connected between a second terminal of said armature winding and said first terminal of said power source, said braking diode being poled to conduct current only during electrical braking of said motor;

g. motor-brake switch means serially connected between said second terminal of said armature and said second terminal of said power source, said motor brake switch means providing an open circuited condition during electrical braking of said motor;

h. current sensor means serially connected in an armature current path for providing an output signal proportional to current in said armature;

i. current control means responsive to a combination of a current command signal and said output signal from said current sensing means for selectively controlling the duty factors of said main thyristor and said auxiliary thyristor in a manner tending to minimize any difference between said command signal and said output signal; and j. field control means connected to said field winding in a manner to control current in said field winding as a function of a desired torque.

9. The system as defined in claim 8 wherein said continuously variable impedance means includes a diode serially connected with said resistor.

10. The system as defined in claim 9 and including a dynamic brake thyristor and a dynamic brake resistor serially connected between said first terminal of said power source and a junction intermediate said freewheeling diode and said continuously variable impedance means.

11. The system of claim 2 and including:

a. means for periodically activating said commutation circuit;

b. a priority control system adapted to supply perodic gating signals to said auxiliary and said main thyristors in a manner alternatively to vary their duty factors so as to regulate current in said armature to a desired value, said control system being operative to vary the duty factor of said auxiliary thyristor for varying the impedance of said variable impedance means over a range from a maximum to a minimum value without supplying gating signals to said main thyristor and bing operative to vary the duty factor of said main thyristor while maintaining said variable impedance means at its minimum value.

12. The system of claim 11 wherein said priority control system comprises:

a. means for producing an error signal representative of any difference between desired and actual magnitudes of current in said armature;

b. compensating means for deriving from said error signal a compensated signal having a value that varies in a predetermined sense in response to the error signal that is produced when the desired magnitude of armature current exceeds the actual magnitude thereof, the value of said compensated signal being substantially constant when said desired and actual magnitudes are equal to one another;

c. first control means responsive to said compensated signal and operative when said compensated signal has a value within a predetermined first range that extends from a predetermined quiescent value to a predetermined break point value that is relatively small and of said predetermined sense for varying the impedance of said variable impedance means between relatively high and low limits as a function of the value of said compensated signal within said first range; and d. second control means for controlling said chopper circuit in response to said compensated signal when in a predetermined second range of values extending in said predetermined sense beyond said break point value by perodically firing said main thyristor and increasing its duty factor from essentially zero as the value of said compensated signal increases within said second range, said second control means being inoperative to fire said main thyristor when the value of said compensated signal is within said first range, whereby power to said armature during propulsion of said motor is metered by said main thyristor when the value of said compensated signal is within said second range and is metered by the combination of said commutating circuit and said variable impedance means when the value of said compensated signal is within said first range.

13. The system of claim 12 wherein said auxiliary thyristor is so located as to be commutated off by said commutating circuit when activated.

14. The system of claim 12 wherein said first control means is operative when said compensated signal is in said second range to maintain said impedance at its minimum value.

15. The system of claim 12 wherein said second control means is operative to vary the factor of said main thyristor between essentially zero and 100% as the value of said compensated signal varies through said second range, said second range being appreciably larger than said first range.

16. A d-c electric traction motor propulsion system comprising:
 a. a d-c electric traction motor including an armature;
 b. a d-c power source;
 c. a chopper circuit including a main thyristor and a commutating circuit;
 d. means for interconnecting said motor and said source to provide a path including said chopper circuit for armature current during electrical propulsion of said motor;
 e. first conduction means connected in parallel circuit relationship with said armature for providing a path for armature current when said chopper circuit is non-conductive;
 f. continuously variable impedance means connected in series with said first conduction means;
 g. means for producing an error signal representative of any difference betweeen desired and actual magnitudes of current in said armature;
 h. compensating means for deriving from said error signal a compensated signal having a value that varies in a predetermined sense in response to the error signal that is produced when the desired magnitude of armature current exceeds the actual magnitude thereof, the value of said compensated signal being substantially constant when said desired and actual magnitudes are equal to one another;
 i. first control means responsive to said compensated signal and operative when said compensated signal has a value within a predetermined first range that extends from a prdetermined quiescent value to a predetermined first value that is relatively small and of said predetermined sense for varying the impedance of said variable impedance means between relatively high and low limits as a function of the value of said compensated signal within said first range; and
 j. second control means for controlling said chopper circuit in response to said compensated signal when in a predetermined second range of values extending in said predetermined sense beyond said first value by periodically firing said main thyristor and increasing its duty factor from essentially zero as the value of said compensated signal increases within said second range, said second control means being inoperative to fire said main thyristor when the value of said compensated signal is within said first range, whereby armature current is regulated by said main thyristor when the value of said compensated signal is within said second range and is regulated by the combination of said commutating circuit and said variable impedance means when the value of said compensated signal is within said first range.

17. The system of claim 16 and including:
 a. a second conduction means connected in parallel with the series combination of said chopper circuit and said armature for providing an armature current path only during electrical braking of said motor; and
 b. means for reconnecting said first conduction means and said variable impedance in series circuit between said armature and said power source whereby a series current path comprising said first conduction means, said variable impedance means, said second conduction means, said armature and said power source is provided for regenerative electrical braking operation of said motor.

18. The system of claim 17 and including a dynamic braking circuit connected in parallel circuit arrangement with the series combination of said armature and said variable impedance means, said dynamic braking circuit comprising energy dissipating means and serially connected switching means for actuating said energy dissipating means.

* * * * *